Dec. 26, 1944.  E. F. FLINT  2,366,016
OPTICAL INSTRUMENT
Filed April 7, 1943   2 Sheets-Sheet 1
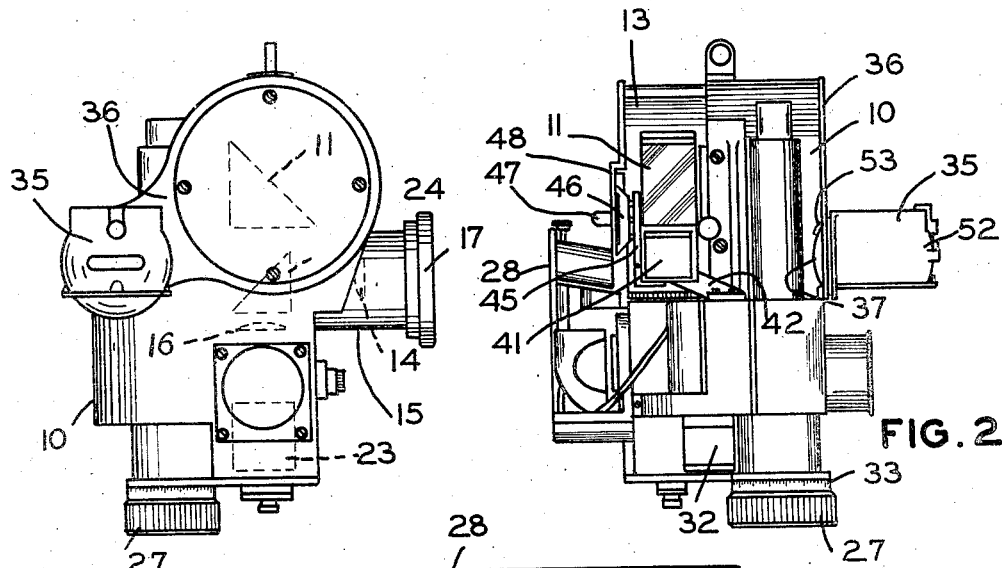
FIG. 1
FIG. 2
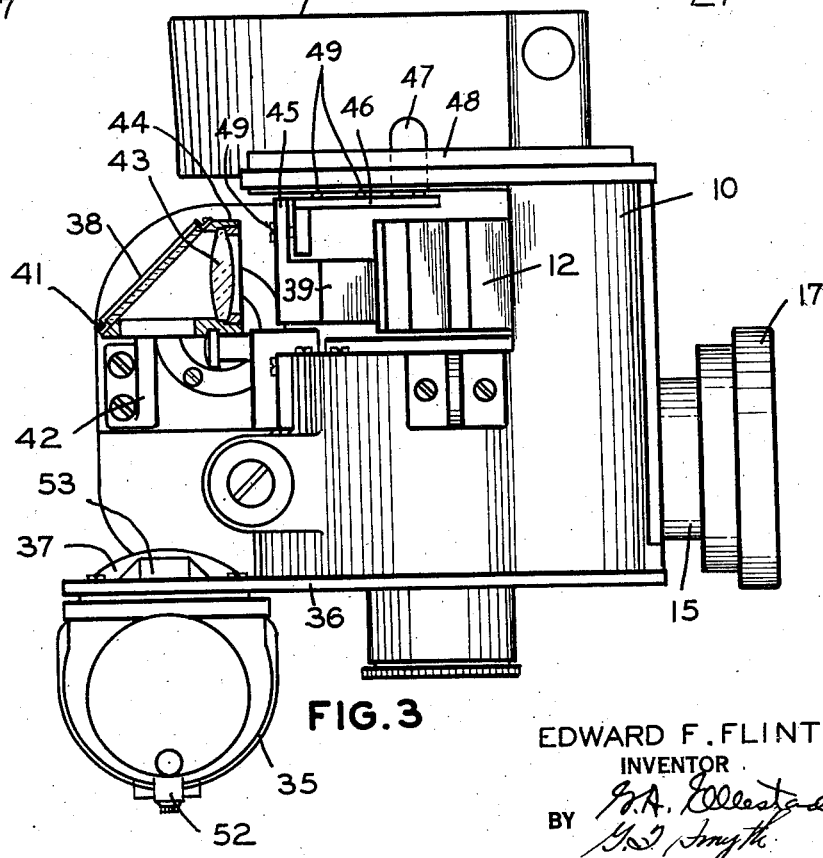
FIG. 3
EDWARD F. FLINT
INVENTOR
BY
ATTORNEYS

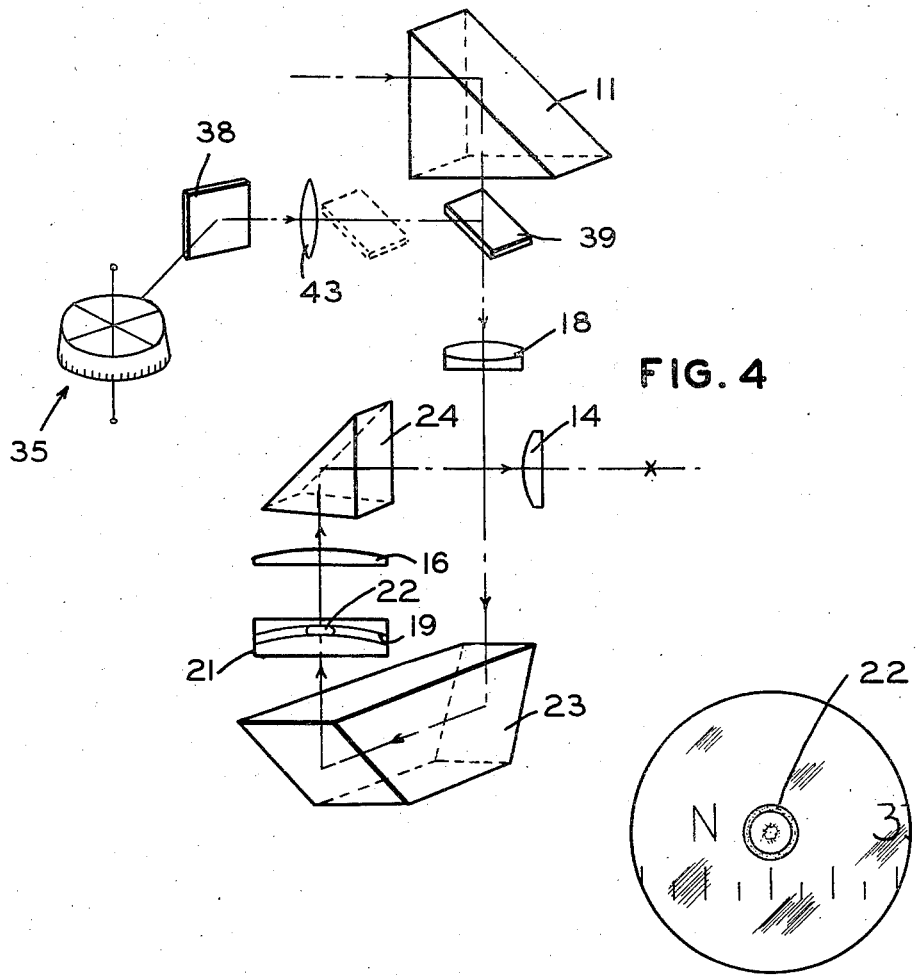

Patented Dec. 26, 1944

2,366,016

UNITED STATES PATENT OFFICE 2,366,016

OPTICAL INSTRUMENT

Edward F. Flint, Rochester, N. Y., assignor to Bausch & Lomb Optical Company, Rochester, N. Y., a corporation of New York Application April 7, 1943, Serial No. 482,144

2 Claims. (Cl. 88—2.7)

The present invention relates to optical instruments and more particularly to an instrument for use in celestial navigation.

The instrument of the present invention includes an octant or a sextant for measuring the altitude or angular elevation of an observed body above a horizontal plane. As the octant or sextant may be used for locating a position where the real horizon may not be visible, a bubble cell is used to establish the horizontal plane.

With the increase in the flying range and the cruising altitude of modern aircraft the importance of celestial navigation is becoming more and more widely recognized. Celestial navigation today generally consists in establishing lines of position and obtaining a "fix" by observing two or more celestial bodies or by taking two or more observations of the same celestial body at intervals of time; for example, of the sun during the day or the moon at night when its brilliance makes it difficult to use the stars or the planets.

To obtain a line of position from a celestial body certain observations are made by the observer from the actual position and certain values for the celestial body observed are computed from an assumed position and the results of these operations are compared. Among the values which must be determined are the altitude or angular elevation of the celestial body, declination, the angular distance from the celestial equator, the local hour angle which is the angular distance along the celestial equator between the meridian of the body and the meridian of the observer, and azimuth, the angle, measured generally from the nearest pole, between the meridian of the observer and a vertical circle containing the body and the point of observation.

If an observer measured the azimuth of the selected body at the same time the altitude or angular elevation of the body was measured, it would be possible to locate a point on the circle of position at which the radius of the circle forms with the meridian at that point an angle equal to the measured azimuth. This point would then locate or "fix" the observer's position on the circle of position.

It has not been heretofore possible to measure the azimuth of a celestial body from a fast moving airplane. To obtain a line of position a position has been assumed, the time of the observation has been noted, and the azimuth of the celestial body has been computed for the assumed position at the time of the observation. After the position has been assumed, local hour angle for that position is computed from Greenwich hour angle which can be obtained from the Nautical Almanac.

This has complicated the calculations necessary to locate the position, and an object of the present invention is to provide a means for simplifying the computations necessary to find an observer's position on the earth's surface.

As the index reflector of an instrument such as an octant or a sextant moves in a plane normal to the horizontal when the instrument is properly used, the plane of measurement of such an instrument is actually the vertical plane or circle of the celestial body observed. Thus, as azimuth is the angle between the meridian of the observer and the vertical circle of the body and the point of observation, that is, the bearing of the body measured from a pole point on the observer's horizon, its value can be determined by measuring the angular relationship between the measurement plane of the octant and the observer's meridian.

The present invention provides a means for simplifying the computations heretofore necessary to locate position for with the instrument of the present invention, it is possible to measure the azimuth of the observed body even as the altitude or angular elevation of the body is being measured.

In the broader aspects of the present invention, this means comprises a direction indicating device, such as a compass, and a suitable optical system for viewing the indicating means of the device. In the form of the invention now preferred, the optical system superimposes an image of the indicating means of the device on the focal plane of the eyepiece of the instrument so that the bearing of the observed body can be read, as the image of the observed body is being brought into coincidence with the bubble. As the bubble and the images of the indicating means and the observed body are viewed in superimposed relationship, the bubble and the images can be caused to coincide and the azimuth or bearing of the observed body is read from the image of the indicating means formed by the optical system.

Other objects and advantages of the present invention will appear from the following description taken in connection with the accompanying drawings in which:

Fig. 1 is an elevational view of the instrument of the present invention wherein a portion of the optical system thereof is shown in broken lines.

Fig. 2 is a front view in elevation of the instrument of the present invention.

Fig. 3 is a top plan view of the instrument of the present invention.

Fig. 4 is a schematic view of the optical system of the instrument of the present invention.

Fig. 5 is a schematic view of the images seen in the eyepiece of the instrument.

The instrument of the present invention, referring now to the drawings, comprises a casing 10 housing the optical system of the instrument, a part of which is shown in broken lines in Fig. 1, and the operating mechanism of the instrument.

The optical system in its now preferred form comprises an index prism 11 mounted in a carrier 12 pivotally mounted in a recess 13 formed in the front base of the casing 10. The eyepiece of the optical system comprises an eye lens 14 carried by an ocular tube 15 projecting from the casing 10 and a collective lens 16 mounted within the casing. The ocular tube carries the usual eye guard 17 and may include a pair of telescopic sections relatively adjustable to permit the eyepiece to be focused by an observer.

To render celestial bodies of even small magnitude visible, and to increase the sharpness of the image of the body observed, it is preferred to form the eye lens and the collective lens so that there is some telescopic power. Any power desired can be obtained by varying the equivalent focal length of the eyepiece relative to the equivalent focal length of the objective 18. The power of the system is preferably one which will bring out a crisp image of the celestial body observed but should not be so high as to make the instrument difficult to hold on the body.

The objective 18 in the form now preferred is achromatic and has an equivalent focal length equal to the radius of the bubble lens curve 19 of the bubble cell 21 and the center of curvature of the bubble lens curve lies in the principal plane of the objective 18. Thus an image of the bubble 22 of the cell is not superimposed on the focal plane of the objective 18 but is actually viewed in that plane and movement of the bubble 22 is constrained to an arc substantially coincident with the focal plane of the objective.

As the bubble lens curve lies in the focal plane of the objective the images of the celestial body observed and the bubble will move at the same speed but as the images formed by the eyepiece and objective are reversed as well as inverted, the images will move in opposite directions.

To reverse the reverted image formed by the eyepiece and objective, a reversing prism 23 is mounted within the casing 10 in such a manner that the exit ray of the prism is reversed and displaced laterally from the entrance ray of the same. Thus the image is reversed and the optical path is bent back so that the system can be mounted within a smaller casing than would be possible with the optical path lying in one plane.

Any means may be used to invert the image, although in the form of the invention now preferred, a prism 24 is placed between the collective 16 and the eye lens 14 and cooperates with the index prism 11 to turn the image inverted by the eyepiece and objective 180 degrees about the horizontal axis of the same. Accordingly the images formed by the optical system of the instrument of the present invention are normal, that is, erect and normal right to left.

Due to the particular disposition of the bubble cell 21, in the optical system and as the images formed by the same are normal, the bubble will move at the same rate of speed and in the same direction as the image of the celestial body observed and coincidence can be made anywhere in the vertical measurement plane of the bubble field. This simplifies the use of the instrument, particularly in a yawing aircraft.

The operating mechanism for adjusting the position of the index prism forms no part of the present invention, as it is described and claimed in my prior application, Serial #462,379, filed October 17, 1942. For the purpose of describing the operation of the instrument of the present invention, it is believed sufficient to say that the index prism 11 may be adjusted by a suitable rotation of the knob 27 which is affixed to one end of a shaft carrying a gear mechanism for rotating the index prism.

In the use of the instrument of the present invention an observer supports the instrument by grasping the handle 28 and by suitable rotation of the operating knob 27 to adjust the index prism 11 relative to the celestial body being observed is able to bring the image of the observed body into coincidence with the bubble 22.

It is now preferred, in the use of instruments such as the octant here illustrated, to take a series of measurements and then through some suitable mechanism determine the average or median value of the series of measurements taken. In my application, Serial Number 412,275, filed September 25, 1941, I disclose and claim a median device which is very conveniently adapted to the octant shown herein. The median device of my prior application, Serial Number 412,275, shown here at 41, is operable through a gear train, not shown, driven by operation of the shaft to which the operating knob 27 is affixed. The value of the median measurement can be determined by a suitable register 32 also driven by the shaft of the operating knob 27. The register is formed with a suitable transparent window through which the indications thereof are visible to the observer. The register is calibrated in degrees and the minutes of the measurements possible with the instrument are read from a suitable scale 33 carried by the operating knob 27 and cooperable with a suitable index mark carried by the casing 10.

The index reflector 11 is so mounted that it moves in a plane normal to the horizontal plane in which the instrument is held in the proper use of the same and the vertical measurement plane of the instrument is actually the vertical plane or circle of the observed body.

The measurement made by bringing the image of an observed body into coincidence with the bubble 22 is the altitude or angular elevation of the observed body above the horizontal plane established by the bubble of the bubble level 21. From this measurement an observer is able to determine his circle of position on the earth's surface for the sub-stellar or geographical point of the observed body can be found by reference to the Navigator's Almanac.

It is known that if an observer could project a line from the sub-stellar point of the observed body in the opposite direction to the bearing of the observed body, this line would cut the circle of position at the point where the observer is located, thus establishing a "fix." He therefore would know his position accurately with a single observation and without the additional calculation for the second observation necessary today to establish a "fix." Consequently, if the observer measures the azimuth at the same time that he observes for altitude, a point on the position circle could be found at which the radius makes with the meridian at that point an angle equal to the measured azimuth.

This can be accomplished through the instrument of the present invention for the same comprises means for determining the azimuth of the observed body simultaneously with the measurement of the altitude or angular elevation of the body. As azimuth is the angle at the zenith between the meridian of the observer and the vertical circle of the observed body, which is, as has been previously shown, the plane of measurement of an octant, its value can be determined by measuring the angular relationship between the measurement plane of the octant and the observer's meridian. It will be seen that the angular displacement of the measurement plane of the instrument from the meridian of the observer will actually be the bearing of the observed body.

In the embodiment of the invention now preferred, the pole point on the observer's horizon is determined by a directional means, such as the compass 35 mounted to the wall 36 of the casing 10. Although any compass can be used that will accurately indicate the median of the observer, to simplify the drawings, an aircraft type of magnetic compass has been illustrated in which the card of the compass rotates about a vertical axis.

The front wall of the compass carries a transparent panel 37 through which the card of the compass is visible and it will be seen, referring now to Fig. 3, that the compass is laterally displaced from the measurement plane of the instrument. It is most desirable that the compass indication be visible to the observer as he is making coincidence with the observed body and to this end a plurality of reflectors 38 and 39 are provided for directing the image of the compass card into the optical system of the instrument.

The reflector 38 is carried by a suitable holder 41 supported by a bracket 42 on the instrument casing 10. The bracket 42 also supports a lens element 43 held on the bracket 42 by a retaining ring 44.

The reflector 39 is mounted in the recess 13 and in the form of the invention illustrated is so mounted that it may be moved into and out of the optical path of the instrument. The reflector 39 is fixed to a carrier 45 adjustably connected to a slide 46 operating in a groove formed in the face of the one wall of the recess 13 and actuated by a knob 47 projecting through the wall 48 of the casing 10 and operating in a slot, not shown, formed in the wall of the casing.

The position of the reflector 39 may be adjusted relative to the carrier 45 by means of a plurality of screws 49 interconnecting the carrier to the slide. This permits less accurate machine operation when the screws and the slide are formed and, therefore, lessens the cost of the instrument.

As the reflector 39 is actually moved into the optical path of the instrument intermediate the objective 18 and the index prism 11, it must be formed of a material which will transmit light. In the form of the invention now preferred, the reflector is formed of a plano piece of transparent material such as glass. It will be seen, referring now to Fig. 4, that the front surface of the reflector 39 will reflect at least a portion of the light rays directly thereto by the reflector 38 and will redirect the same to the objective 18 in a path substantially coincident with the path of the light rays reflected by the index reflector 11 and passing through the reflector 39.

It will now be obvious that the reflectors 39 and 38 are so disposed relative to the card of the compass 35 that the latter may be viewed through the eyepiece of the instrument and that the images of the compass card and the celestial body observed will be superimposed. Thus, the observer will be able, by suitable manipulation of the operating knob 27, to cause the image of the observed body and a scale indication on the card of the compass 35 to coincide with the bubble 22.

As the images of the compass card and the celestial body will be focused on a plane substantially coincident with the curve 19 of the bubble cell 21, the bubble and the images of the celestial body and the compass card will appear as all being disposed in one plane and no difficulty will be experienced in bringing the three into the proper aligned relationship.

As the instrument of the present invention will be used at night, the compass 35 carries a standard aircraft bulb 52 and a reflector 53 for directing the light rays emanating from said bulb onto the card of the compass to the end that the card will be visible to an observer while using the instrument at night.

It will now be seen that an observer may, at the time he measures the altitude or angular elevation of a selected celestial body, also measure the azimuth of that body.

From the two measurements obtained, that is, the altitude and the azimuth of the celestial body he may directly calculate his position on the earth's surface without the involved calculations heretofore necessary to establish a "fix."

It will readily be appreciated that the more accurate the compass, the more accurate the azimuth reading will be. A very accurate compass, therefore, should be employed, and if desired, a gyro-compass could be used in place of the magnetic compass shown. It will be further understood that the azimuth could be measured from any predetermined reference instead of the observer's geographical meridian in which case a directional instrument such as the present day directional gyro would replace the compass.

While a preferred embodiment of the present invention has been described and disclosed herein, it is to be understood that the invention need not be limited to the embodiment shown and described, but is susceptible of modification falling within the spirit of the invention and that of the appended claims.

I claim:

1. In an instrument of the type described, an objective; a pivotally mounted reflector for directing light rays from a distant object to said objective; a bubble level having a bubble constrained in movement to an arc substantially coincident with the focal plane of said objective; directional means for indicating direction; a stationary reflector in optical alignment with said means; a transparent reflector mounted for reciprocal movement between alternate positions in the path of the light rays directed by said stationary reflector and in one of said alternate positions adapted to direct light rays from said directional means reflected thereto by said stationary reflector in a path substantially coincident with the path of the light rays directed to said objective by said pivotally mounted reflector whereby said objective forms superimposed images of the distant object and said directional means; and an eyepiece for viewing said bubble and the superimposed images formed by said objective.

2. In an instrument of the type described, an objective; a pivotally mounted reflector for directing light rays from a distant object to said objective; a bubble level having a bubble constrained in movement to an arc substantially coincident with the focal plane of said objective; directional means for indicating direction; a stationary reflector in optical alignment with said means; a transparent reflector; means for mounting said transparent reflector for reciprocal movement between alternate positions on said instrument, said transparent reflector in one of said alternate positions being angularly disposed across the optical axis of said objective and directing light rays reflected thereto by said stationary reflector to said objective in a path substantially coincident with the light rays reflected by said pivotally mounted reflector and transmitted by said transparent reflector whereby said objective forms superimposed images of the distant object and said directional means; and an eyepiece for viewing said bubble and the superimposed images formed by said objective.

EDWARD F. FLINT.